UNITED STATES PATENT OFFICE.

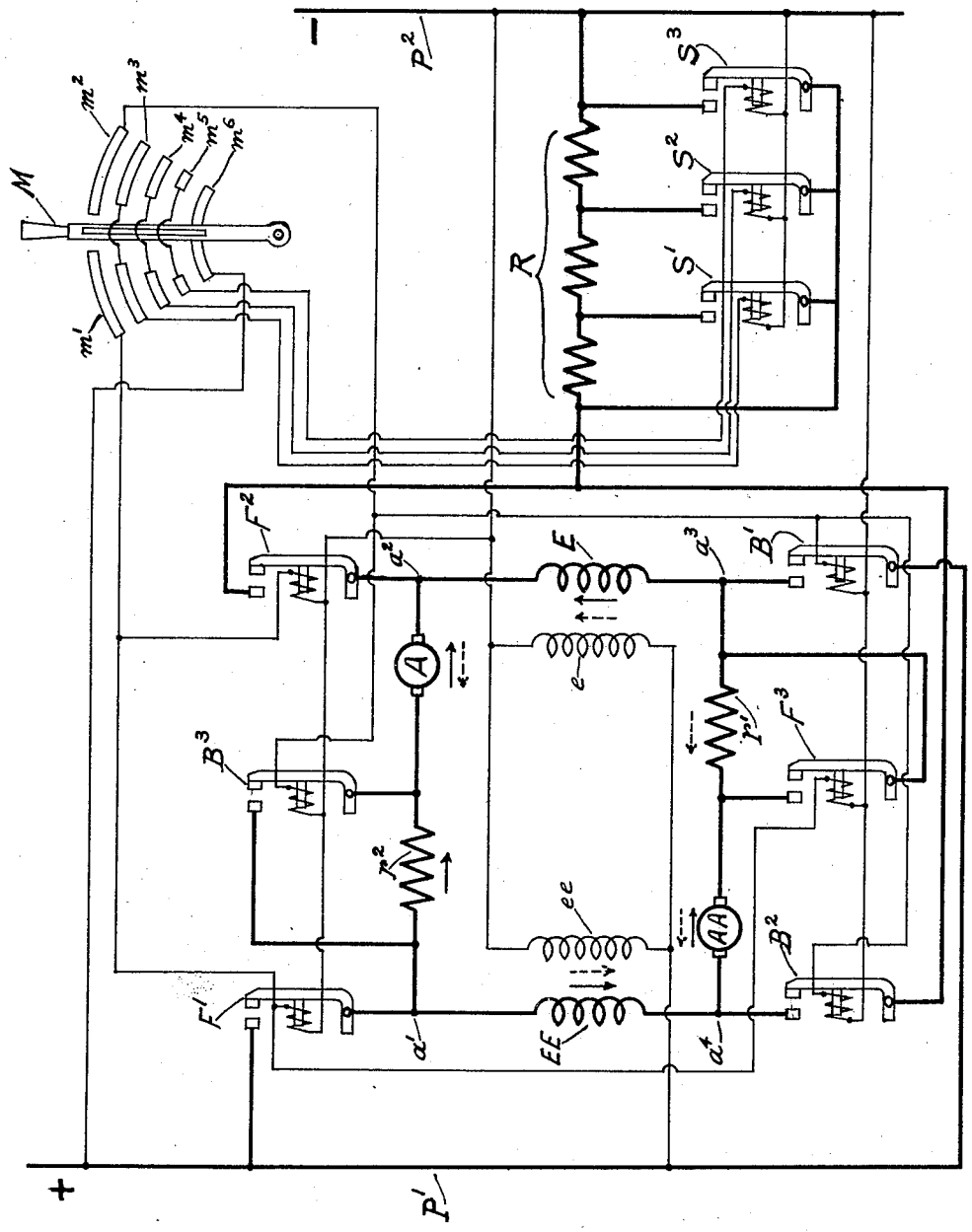

JAY H. HALL, OF CLEVELAND, OHIO, ASSIGNOR TO THE ELECTRIC CONTROLLER AND MANUFACTURING COMPANY, OF CLEVELAND, OHIO, A CORPORATION OF OHIO.

ELECTRIC CONTROLLER.

1,004,780.  Specification of Letters Patent. Patented Oct. 3, 1911.

Application filed July 27, 1911. Serial No. 640,928.

*To all whom it may concern:*

Be it known that I, JAY H. HALL, a citizen of the United States, residing at Cleveland, in the county of Cuyahoga and State of Ohio, have invented new and useful Improvements in Electric Controllers, of which the following is a specification.

My invention relates to control systems for electric motors operating in parallel, and particularly to the reversing of such motors.

In a companion application I have described a system for reversing two series wound motors operating in parallel, in which the connections were such that the field windings of the motors were reversed to reverse the direction of rotation of the motors. Where compound wound motors are used it is undesirable to cause the reversal of the motors by the reversal of the fields, and in a case where it is desired to rapidly reverse a pair of motors operating in parallel, the time required, if the field windings are reversed, to deënergize the fields and reënergize them is sometimes objectionable. It is one of the objects of the present invention to provide a system for reversing two compound wound motors operating in parallel, using a single set of reversing switches, the reversal taking place by reversal of current through the armatures of the two motors. While the motors are operating the two armatures are connected in parallel and the series field windings of both motors are placed in a parallel branch containing one of the armatures. This has the advantage of causing both field windings to receive the same amount of current, and since the field excitation of both armatures will therefore be the same, they will tend to divide the load equally.

The accompanying drawing shows a complete wiring diagram embodying my invention.

Referring to this drawing, one of the motors is shown with the armature A, the series field winding E, and the shunt field winding $e$, the other motor being shown with the armature AA, the series field winding EE, and the shunt field winding $ee$. The shunt field windings are connected in parallel directly to the source of supply, and remain energized as long as the mains $P'$, $P^2$ are connected to the source of supply.

One set of reversing switches for operating the motors in one direction is shown including the switches $F'$, $F^2$. The switch $F^3$ is intended to operate at the same time as the switches $F'$, $F^2$, its function being to short-circuit the resistance $r'$. A set of reversing switches for operating the motors in the opposite direction are shown at $B'$, $B^2$, and the switch $B^3$ operates at the same time as the switches $B'$, $B^2$, and short-circuits the resistance $r^2$.

The starting resistance for the motors is shown at R, this resistance being cut out step by step in the usual manner by means of the switches $S'$, $S^2$, $S^3$. All of the switches are operated from a master controller M.

The operation of the controller is as follows: On moving the master controller handle to the first position on the left, a circuit is established from the positive main through the contacts $m^6$, $m'$, the windings of the switches $F'$, $F^2$, $F^3$, in parallel to the negative. These three switches close simultaneously and the motor circuit is now established as follows: from the positive through the switch $F'$ to a point $a'$ where the circuit divides into two branches, one being through the resistance $r^2$ and the armature A to the point $a^2$; the other branch being through the field winding EE, the armature AA, the contacts of the switch $F^3$, and the field winding E to the point $a^2$ where the two branches unite and pass through the switch $F^2$, and the starting resistance R to the negative. I have shown in solid arrows the direction of current through the armatures and field windings of the motors. Further movement of the master controller handle to the left energizes the contacts $m^3$, $m^4$, $m^5$, which close the switches $S'$, $S^2$, $S^3$, respectively, thereby cutting out the starting resistance and bringing the motors up to their normal speed.

It is seen that the resistance $r^2$, which is equal in resistance to the sum of the resistances of the two field windings E and EE, is placed in the circuit of the armature A so that the ohmic resistance of the two branches of the circuit will be approximately the same and thus cause the current to divide equally in the two motors.

To stop the motors the handle of the master controller is brought to the off or central position. If now the master controller handle is moved to the first position to the right-hand side, the segment $m^2$ will be energized, which will cause the switches B', B², B³ to close and the motor circuits will now be as follows: from the positive through the switch B' to the point $a^3$ where the circuit divides, one branch passing through the resistance $r'$, and the armature AA to the point $a^4$; the other branch being from the point $a^3$ through the field winding E, the armature A, the switch B³, and the field winding EE to the point $a^4$, where the two circuits unite and pass through the switch B² and the resistance R to the negative. I have indicated the direction of current through the field winding of the motors as it now exists by means of dotted arrows, and it will be seen that the current is reversed in the two armature windings and remains the same as before in the two series field windings, so that the motors will run in the opposite direction. Further movement of the controller handle to the right will cause the switches S', S², S³ to close, thereby cutting out the resistance R and bringing the motor up to speed.

It will be noticed that the resistance $r'$, which is equal to the resistance $r^2$, is now in the branch circuit containing the armature AA, which balances the resistances of the two field windings E and EE which are in the branch containing the armature A.

To stop the motors the master controller handle is brought to the off or central position, causing all the switches to open and cut off power from the motors. It is obvious that the three switches F', F², F³ are the equivalent of a three-pole switch operated by a single winding; and the switches B', B², B³, the equivalent of a three-pole single coil switch. It is possible to operate the motors without the use of the resistances $r'$, $r^2$, and the switches F³, B³, but this would cause a slight unbalancing of the circuits and the two motor armatures would not divide the load equally. This unbalancing might be objectionable if the motors were driving heavy loads, but would not be objectionable on light loads. Other arrangements of the resistances $r'$, $r^2$ can be made, such as the case of equally balancing the two circuits for operation of the motors in one direction for driving a heavy load, and allowing the circuits to be unbalanced in the opposite direction for driving a light load.

I have shown my invention using magnetically operated switches for making the various connections in the motor circuits, but it is obvious that any form of switches may be used, manually-operated or otherwise.

I claim—

1. In a motor control system, two motors having their armatures connected in parallel and their fields in series with each other, means connecting a terminal of each armature to one side of a source of supply both fields being in series with one armature, and means connecting the said armature terminals to the opposite side of said source, both fields being in series with the other armature.

2. In a motor control system, two motors, armatures therefor connected in parallel, fields therefor connected in series adapted to be connected in the circuit of one or the other armature, means for directing the current through the armatures in one direction when the fields are in the circuit of one armature, and means for directing the current through the armatures in the opposite direction when the fields are in the circuit of the other armature.

3. In a motor control system, two motors, a pair of switches for connecting the armature of one motor in one branch of a divided circuit including the fields of both motors, the other branch containing the other armature, and a pair of switches for reversing the current through the said armatures.

4. In a motor control system, two motors, a pair of switches for connecting the armature of one motor in a branch circuit including the fields of both motors, the other branch containing the other armature, and a pair of switches for reversing the current through the said armatures and connecting the said first armature in a branch circuit, the other branch containing the said second armature and the said fields.

5. In a control system for electric motors, two motors, armatures therefor connected in parallel, two sets of switches for reversing the current in the said armatures, one set of said switches connecting the fields of both motors in the circuit of one armature and the other set connecting the said fields in the circuit of the other armature.

6. In a control system for electric motors, two motors, armatures therefor connected in parallel, two sets of switches for reversing the current in the said armatures, one set of said switches connecting the fields of both motors in the circuit of one armature and the other set connecting the said fields in the circuit of the other armature, a resistance in one armature circuit, and means for shunting said resistance when the fields are connected in the circuit of said armature.

7. In a control system for electric motors, two motors, armatures therefor connected in parallel, two sets of switches for reversing the current in the said armatures, one set of said switches connecting the fields of both motors in the circuit of one armature and the other set connecting the said fields in the circuit of the other armature, a resistance in each armature circuit, and means for shunting the resistance in the circuit of the armature containing the fields.

8. In a motor control system, two motors having their armatures connected in parallel and their fields in series with each other, means connecting the fields in the circuit of one armature when the current flows in one direction through the armatures, and means connecting the fields in the circuit of the other armature when the current in the armatures is reversed.

Signed at Cleveland, Ohio, this 21st day of July, A. D. 1911.

JAY H. HALL.

Witnesses:
  HENRY L. ASSET,
  H. M. DIEMER.

Copies of this patent may be obtained for five cents each, by addressing the "Commissioner of Patents, Washington, D. C."